(12) United States Patent
Bode et al.

(10) Patent No.: US 8,753,480 B2
(45) Date of Patent: Jun. 17, 2014

(54) ALDEHYDE-FUNCTIONALIZED POLYMERS WITH ENHANCED STABILITY

(71) Applicant: Nalco Company, Naperville, IL (US)

(72) Inventors: Heinrich E. Bode, Aurora, IL (US);
Michael R. St. John, Chicago, IL (US);
Mei Liu, Plainfield, IL (US); Robert M. Lowe, Chicago, IL (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 13/650,686

(22) Filed: Oct. 12, 2012

(65) Prior Publication Data

US 2014/0060763 A1    Mar. 6, 2014

Related U.S. Application Data

(63) Continuation of application No. 12/641,557, filed on Dec. 18, 2009, now Pat. No. 8,288,502.

(51) Int. Cl.
| | |
|---|---|
| D21H 21/10 | (2006.01) |
| D21H 21/20 | (2006.01) |
| D21H 23/02 | (2006.01) |
| D21H 17/49 | (2006.01) |
| C08G 69/50 | (2006.01) |

(52) U.S. Cl.
USPC ............ 162/168.3; 162/158; 162/164.6; 162/166; 162/168.1; 162/184; 162/185; 525/55; 525/154; 525/326.1; 525/329.4; 528/230; 528/245; 528/367

(58) Field of Classification Search
USPC ........ 162/158, 164.1, 164.6, 166, 167, 168.1, 162/168.2–168.3, 183–185, 181.1–181.3, 162/181.5; 525/50, 55, 154, 326.1, 329.4; 528/230, 245, 367
See application file for complete search history.

(56) References Cited

U.S. PATENT DOCUMENTS

| | | | |
|---|---|---|---|
| 2,982,749 | A | 5/1961 | Friedrich et al. |
| 3,284,393 | A | 11/1966 | Vanderhoff et al. |
| 3,556,932 | A | 1/1971 | Coscia et al. |
| 3,734,873 | A | 5/1973 | Anderson et al. |
| 4,603,176 | A | 7/1986 | Bjorkquist et al. |

(Continued)

FOREIGN PATENT DOCUMENTS

| | | |
|---|---|---|
| EP | 183466 B1 | 8/1990 |
| EP | 657478 A2 | 6/1995 |

(Continued)

OTHER PUBLICATIONS

Hunkeler, et al., "Mechanism, Kinetics and Modeling of the Inverse-Microsuspension Homopolymerization of Acrylamide," Polymer, vol. 30(1), pp. 127 to 42 (1989).

(Continued)

*Primary Examiner* — Dennis Cordray
(74) *Attorney, Agent, or Firm* — Edward O. Yonter

(57) ABSTRACT

The current invention includes a composition having stability additives of selected inorganic salts and/or organic incorporated into an aldehyde-functionalized polymer product. The stability additive can be post added to the finished polymer product, added to the reaction vessel prior to inducing functionalization of the non-functionalized polymer, or added at any stage during the functionalization reaction. Methods for forming the composition and using the composition to produce a cellulosic fiber-based medium are also disclosed.

19 Claims, 7 Drawing Sheets

(56) References Cited

U.S. PATENT DOCUMENTS

| | | |
|---|---|---|
| 4,605,702 A | 8/1986 | Guerro et al. |
| 4,919,821 A | 4/1990 | Fong et al. |
| 4,929,655 A | 5/1990 | Takeda et al. |
| 5,006,590 A | 4/1991 | Takeda et al. |
| 5,147,908 A | 9/1992 | Floyd |
| 5,571,380 A | 11/1996 | Fallon et al. |
| 5,597,858 A | 1/1997 | Ramesh et al. |
| 5,597,859 A | 1/1997 | Hurlock et al. |
| 5,605,970 A | 2/1997 | Selvarajan et al. |
| 5,654,198 A | 8/1997 | Carrier |
| 5,674,362 A | 10/1997 | Underwood et al. |
| 5,837,776 A | 11/1998 | Selvarajan et al. |
| 5,985,992 A | 11/1999 | Chen |
| 6,013,708 A | 1/2000 | Mallon et al. |
| 6,077,394 A | 6/2000 | Spence et al. |
| 6,083,348 A | 7/2000 | Auhorn et al. |
| 6,315,866 B1 | 11/2001 | Sanches |
| 6,426,383 B1 | 7/2002 | Fong et al. |
| 6,472,487 B2 | 10/2002 | Schroeder et al. |
| 6,610,209 B1 | 8/2003 | Sommese et al. |
| 6,749,721 B2 | 6/2004 | Shannon et al. |
| 7,034,087 B2 | 4/2006 | Hagiopol et al. |
| 7,119,148 B2 | 10/2006 | Hagipol et al. |
| 7,488,403 B2 | 2/2009 | Hagiopol et al. |
| 8,197,640 B2 * | 6/2012 | Schaffer ............ 162/168.3 |
| 2005/0161181 A1 | 7/2005 | St. John et al. |
| 2005/0187356 A1 * | 8/2005 | Hagiopol et al. ...... 525/329.4 |
| 2008/0308242 A1 | 12/2008 | Lu |
| 2009/0165978 A1 | 7/2009 | Hagipol et al. |
| 2011/0146925 A1 * | 6/2011 | Bode et al. ............ 162/164.1 |

FOREIGN PATENT DOCUMENTS

| | | |
|---|---|---|
| EP | 657478 A3 | 6/1995 |
| EP | 183466 B2 | 8/1997 |
| EP | 630909 B1 | 10/1998 |

OTHER PUBLICATIONS

Hunkeler et al., "Mechanism, Kinetics and Modeling of Inverse-Microsuspension Polymerization: 2. Copolymerization of Acrylamide with Quaternary Ammonium Cationic Monomers," Polymer, vol. 32(14), pp. 2626 to 40 (1991).
Polymer, 1994, 35, 2148.
Perez product analysis (1999).
Hercobond product analysis (2002).

* cited by examiner

FIG. 5

| Sample | Stability Additive | Additive Amt., wt% | Addition Method | Actives Conc., wt% | BFV, cps | Days to Gel @ RT | Reference Time to Gel, RT | Change in Gel time RT | Days to Gel @ 35C | Reference Time to Gel, 35C | Change in Gel time 35C |
|---|---|---|---|---|---|---|---|---|---|---|---|
| 5978-139-1 | None | 0.0 | NA | 9.0 | 19.0 | 49 | 44 | 5 | 6 | 6.4 | -0.4 |
| 5978-179-1 | None | 0.0 | NA | 9.0 | 18.2 | 42 | 47 | -5 | 8 | 6.9 | 1.1 |
| 5978-43-1 | None | 0.0 | NA | 9.0 | 21.6 | 35 | 35 | 0 | 5 | 5.1 | -0.1 |
| 5978-112-3 | None | 0.0 | NA | 9.0 | 9.8 | 100 | 95 | 5 | 15 | 14.9 | 0.1 |
| 5978-112-4 | None | 0.0 | NA | 9.0 | 15.9 | 59 | 58 | 1 | 8 | 8.6 | -0.6 |
| 5978-139-2 | glycerol | 1.0 | post | 8.9 | 19.0 | 51 | 44 | 7 | 7 | 6.4 | 0.6 |
| 5978-139-3 | glycerol | 2.0 | post | 8.8 | 18.8 | 55 | 45 | 10 | 7 | 6.5 | 0.5 |
| 5978-139-4 | ethylene glycol | 1.0 | post | 8.9 | 19.0 | 53 | 44 | 9 | 7 | 6.4 | 0.6 |
| 5978-56 | Urea | 1.0 | added 5mins before kill | 9.0 | 17.2 | 49 | 52 | -3 | 7 | 7.6 | -0.6 |
| 5978-181 | Mg(OAc)$_2$ | 3.0 | pre | 9.0 | 17.1 | 48 | 52 | -4 | 12 | 7.7 | 4.3 |
| 5978-41 | MgCl$_2$*6H$_2$O | 3.0 | pre | 9.0 | 15.6 | 65 | 59 | 6 | 11 | 8.9 | 2.1 |
| 5978-132-1 | MgSO$_4$·7H$_2$O | 6.0 | pre | 9.0 | 8.0 | 174 | 109 | NA | 26 | 17.3 | 8.7 |
| 5978-132-2 | MgSO$_4$·7H$_2$O | 6.0 | pre | 9.0 | 13.2 | 95 | 73 | 22 | 14 | 11.1 | 2.9 |
| 5978-42 | MgSO$_4$·7H$_2$O | 6.0 | pre | 9.0 | 16.7 | 75 | 54 | 21 | 12 | 8.0 | 4.0 |
| 5978-132-4 | MgSO$_4$·7H$_2$O | 6.0 | pre | 9.0 | 20.2 | 59 | 40 | 19 | 8 | 5.7 | 2.3 |
| 5978-55 | ZnSO$_4$·7H$_2$O | 1.0 | pre | 9.0 | 22.6 | 49 | 33 | 16 | 7 | 4.7 | 2.3 |

FIG. 6

| Sample | Stability Additive | Additive Amt., wt% | Addition Method | Actives Conc., wt% | BFV, cps | Days to Gel @ RT | Reference Time to Gel, RT | Change in Gel time RT | Days to Gel @ 35C | Reference Time to Gel, 35C | Change in Gel time 35C |
|---|---|---|---|---|---|---|---|---|---|---|---|
| 5978-149-2 | None | 0.0 | NA | 12.0 | 14.1 | 52 | 52 | 0 | 8 | 8.0 | 0.0 |
| 5978-149-4 | None | 0.0 | NA | 12.0 | 21.5 | 33 | 33 | 0 | 5 | 5.0 | 0.0 |
| 5978-149-5 | None | 0.0 | NA | 12.0 | 28.1 | 26 | 26 | 0 | 4 | 4.0 | 0.0 |
| 5978-184-1 | MgSO$_4$·7H$_2$O | 6.0 | pre | 12.0 | 8.9 | 117 | 72 | NA | 21 | 11.3 | 9.7 |
| 5978-184-2 | MgSO$_4$·7H$_2$O | 6.0 | pre | 12.0 | 15.2 | 53 | 48 | 5 | 10 | 7.4 | 2.6 |
| 5978-184-3 | MgSO$_4$·7H$_2$O | 6.0 | pre | 12.0 | 17.7 | 44 | 41 | 3 | 9 | 6.3 | 2.7 |
| 5978-184-4 | MgSO$_4$·7H$_2$O | 6.0 | pre | 12.0 | 20.0 | 37 | 36 | 1 | 7 | 5.4 | 1.6 |
| 5978-184-5 | MgSO$_4$·7H$_2$O | 6.0 | pre | 12.0 | 24.5 | 30 | 29 | 1 | 5 | 4.3 | 0.7 |
| 6080-8-3 | MgSO$_4$·7H$_2$O | 3.0 | post | 12.0 | 26.4 | 23 | 27 | -4 | 5 | 4.1 | 0.9 |
| 6080-7-2 | MgSO$_4$·7H$_2$O | 6.0 | post | 12.0 | 18.0 | 40 | 40 | NA | 8 | 6.2 | 1.8 |
| 6080-8-2 | MgSO$_4$·7H$_2$O | 6.0 | post | 12.0 | 30.7 | 21 | 26 | -5 | 5 | 4.0 | 1.0 |
| 6080-7-1 | Na$_2$SO$_4$ | 3.5 | post | 12.0 | 16.9 | 44 | 43 | NA | 8 | 6.6 | 1.4 |
| 6080-8-1 | Na$_2$SO$_4$ | 3.5 | post | 12.0 | 27.2 | 24 | 26 | -2 | 5 | 4.0 | 1.0 |

ALDEHYDE-FUNCTIONALIZED POLYMERS WITH ENHANCED STABILITY

CROSS REFERENCE TO RELATED APPLICATION

This application is a continuation of U.S. patent application Ser. No. 12/641,557, "Aldehyde-Functionalized Polymers with Enhanced Stability," filed on Dec. 18, 2009, now U.S. Pat. No. 8,288,502, which is incorporated herein in its entirety.

TECHNICAL FIELD

This invention relates generally to stabilized formulations of aldehyde-functionalized polymers. More specifically, the invention relates to formulations of aldehyde-functionalized polymers stabilized with an inorganic salt, an organic additive, or combinations thereof. The invention has particular relevance to such stabilized formulations for use in the papermaking industry.

BACKGROUND

Aldehyde-functionalized polymers based on polyacrylamide (and similar polymers), provide a multitude of benefits for paper and paperboard manufacturing that include temporary wet strength, dry strength, wet-web strength, Yankee dryer adhesives, and increased press dewatering. Although benefits of such products are well established, the polymers suffer from instability towards gelling resulting in short shelf lives and low actives concentrations. This instability limits their use under some circumstances, presents significant logistical issues of storage and shipping, and results in lost batches that require disposal. Additionally, the stability of these polymers is sensitive to actives concentrations, and achieving acceptable shelf life necessitates low actives concentrations, which in turn increases costs of manufacture and shipping as well as requiring increased storage space.

U.S. patent application Ser. No. 10/785,403, "Glyoxylated Polyacrylamide Composition Strengthening Agent," discloses an acidified glyoxalated polyacrylamide dosed with additional glyoxal. U.S. patent application Ser. No. 12/138,766, "High Solids Glyoxalated Polyacrylamide," discloses stabilized glyoxalated polyacrylamide compositions having a high concentration of polymer solids.

A demonstrated need therefore exists for formulations of aldehyde-functionalized polymers based on polyacrylamide with improved stability and increased shelf-life. For these reasons, increased stability of such polymers is desirable to extend the product shelf life at fixed actives or to increase the actives concentrations at fixed shelf life. Longer shelf life is particularly desired in papermaking circumstances where such polymers are not continuously run, but are run only on selected grades. In addition, increased shelf life is desirable where long shipping distances are encountered due to lack of manufacturing facilities at point of use.

SUMMARY

This invention accordingly provides novel compositions of aldehyde-functionalized polymers with increased stability over prior art formulations. The present invention provides novel compositions and methods of their preparation. A description of the base polymers in their various forms and methods of preparation is provided below and can further be found in U.S. Pat. No. 7,641,766, "Method of Using Aldehyde-Functionalized Polymers to Enhance Paper Machine Dewatering."

In a preferred aspect, the current invention includes a composition having stability additives of selected inorganic salts and/or organic chemicals (sometimes collectively referred to herein as "stability additive(s)") incorporated into the polymer product at concentrations between about 0.5 wt % and about 10 wt %. In alternative embodiments, the stability additive can be post added to the finished polymer product, added to the reaction vessel prior to inducing functionalization of the non-functionalized polymer, or added at any stage during the functionalization reaction.

In another aspect, the invention is a composition for enhancing a papermaking process. In a preferred embodiment, the composition includes one or more aldehyde-functionalized polymers with a weight average molecular weight of at least about 50,000 g/mole and one or more stabilizing agents.

In another aspect, the invention is a method of producing a medium having cellulosic fibers, comprising adding the disclosed composition to the medium at any point in the process of making the medium. Preferred aspects of the invention relate to the manufacture of paper and paperboard in a papermaking process.

In a further aspect, the present invention is a method for increasing a storage time for a composition comprising one or more aldehyde-functionalized polymers. The method includes introducing one or more stabilizing agents to the one or more aldehyde-functionalized polymers, where the one or more stabilizing agents is selected from the group consisting of inorganic salts, organic additives, and any combinations thereof. The storage time is measured relative to a comparable non-stabilized aldehyde-functionalized polymer.

It is an advantage of the invention to provide increased reactor yield, reduced storage capacity, and/or reduced shipping costs of formulations including aldehyde-functionalized polymers.

It is another advantage of the invention to extend the product shelf-life of aldehyde-functionalized polymers at fixed actives concentrations or to increase actives concentrations at a fixed shelf-life.

It is a further advantage of the invention to provide novel methods of producing aldehyde-functionalized polymer formulations with increased stability.

Additional features and advantages are described herein, and will be apparent from, the following Detailed Description, Examples, and Figures.

BRIEF DESCRIPTION OF THE DRAWINGS

FIG. 5 illustrates tabular data showing stability increases for 0.8 glyoxalated DADMAC/AcAm formulations containing a variety of different additives with different addition methods at room temperature (RT) and 35° C. with actives concentrations of 9 wt %.

FIG. 6 illustrates tabular data showing stability increases for 0.8 glyoxalated DADMAC/AcAm formulations containing a variety of different additives with different addition methods at room temperature (RT) and 35° C. with actives concentrations of 12 wt %.

DETAILED DESCRIPTION

Figure 1:
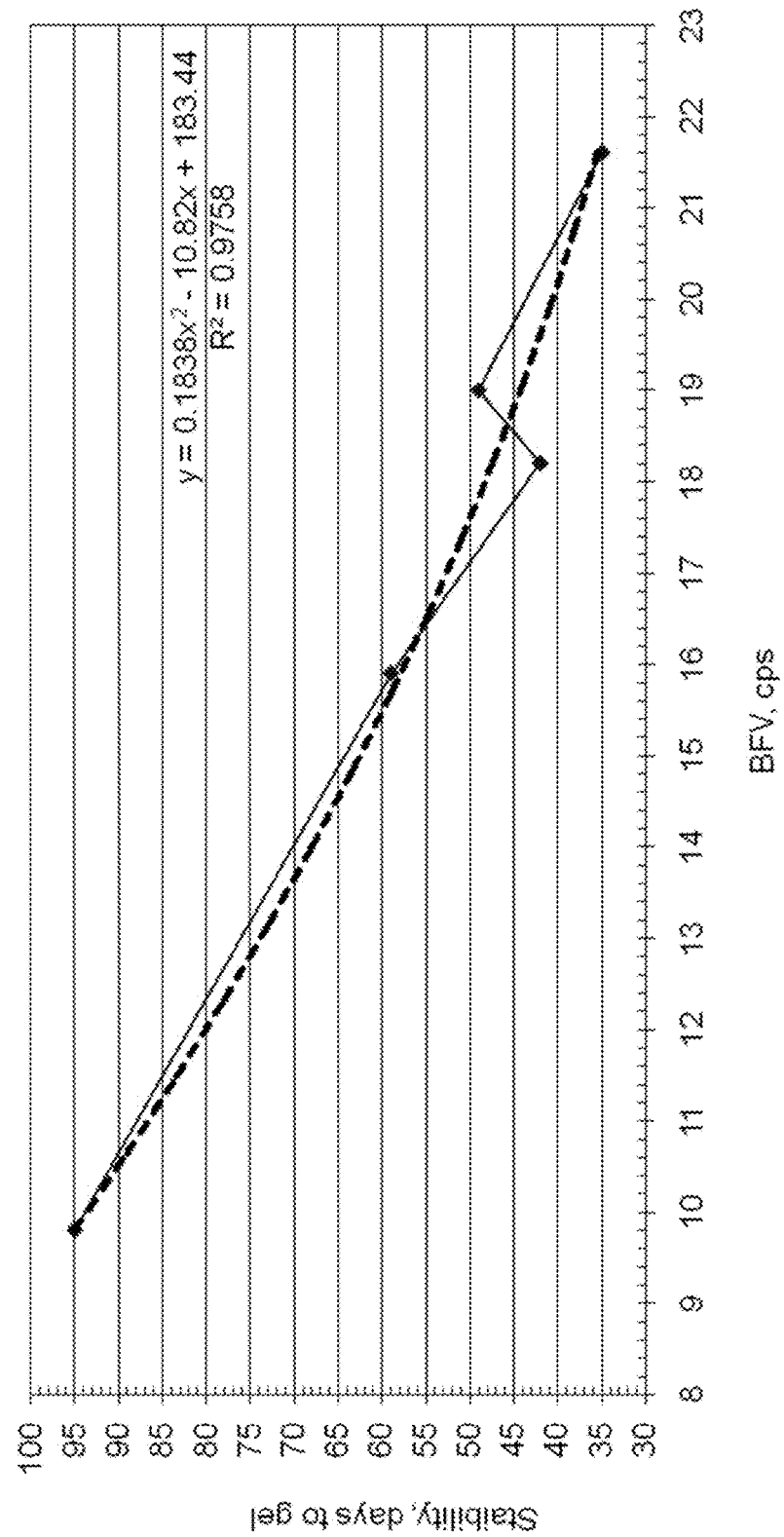
FIG. 1 illustrates the stability using a "Days to Gel" measurement parameter at room temperature versus initial product Brookfield Viscosity [BFV] for a polymer prepared by glyoxalation of a diallyldimethylammonium chloride-co-acrylamide polymer [5/95 molar ratio] using a glyoxal to acrylamide molar ratio of 0.8 at 9 wt %.
Figure 2:
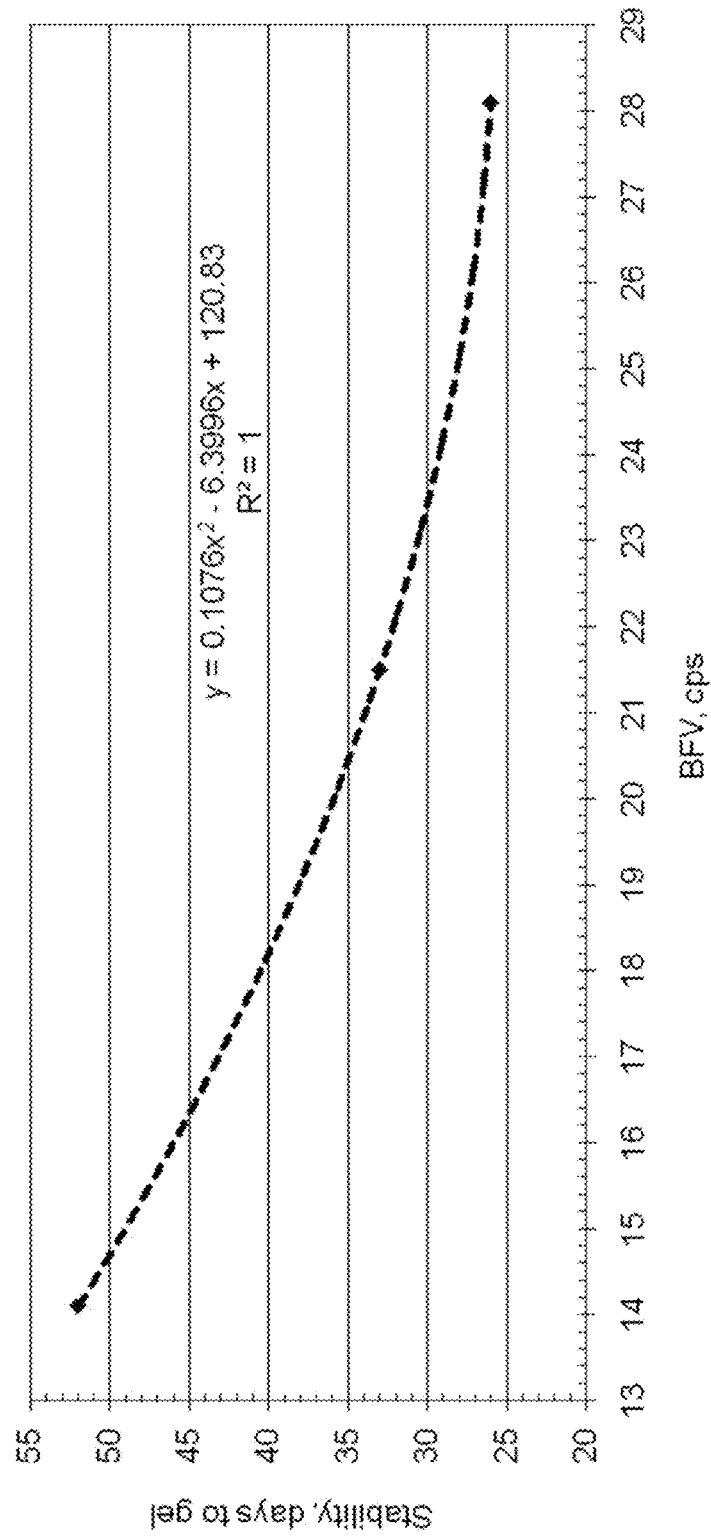
FIG. 2 illustrates the stability using a "Days to Gel" measurement parameter at room temperature versus initial product Brookfield Viscosity [BFV] for a polymer prepared by glyoxalation of a diallyldimethylammonium chloride-co-acrylamide polymer [5/95 molar ratio] using a glyoxal to acrylamide molar ratio of 0.8 at 12 wt %.
Figure 3:
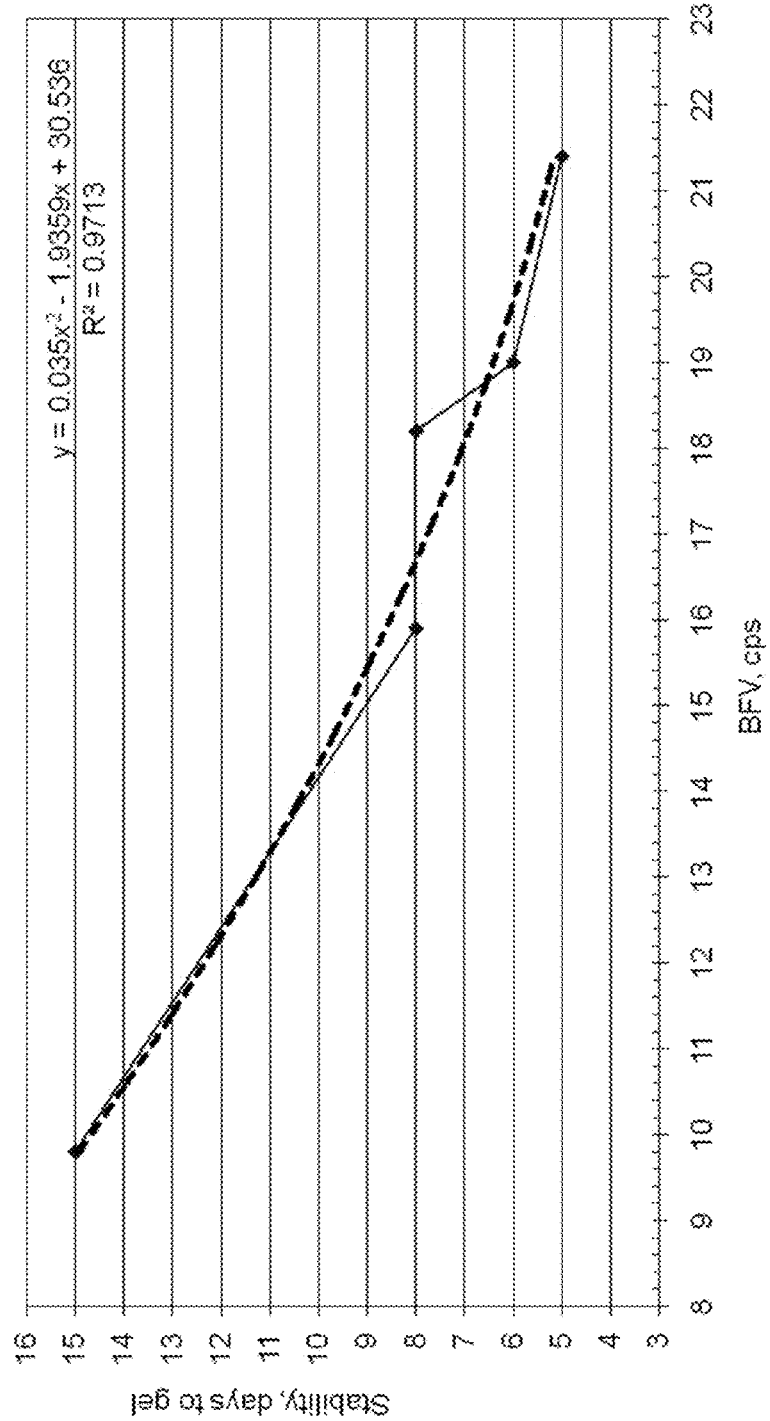
FIG. 3 shows the stability using a "Days to Gel" measurement parameter at 35° C. versus initial product Brookfield Viscosity [BFV] for a polymer prepared by glyoxalation of a diallyldimethylammonium chloride-co-acrylamide polymer [5/95 molar ratio] using a glyoxal to acrylamide molar ratio of 0.8 at 9 wt %.
Figure 4:
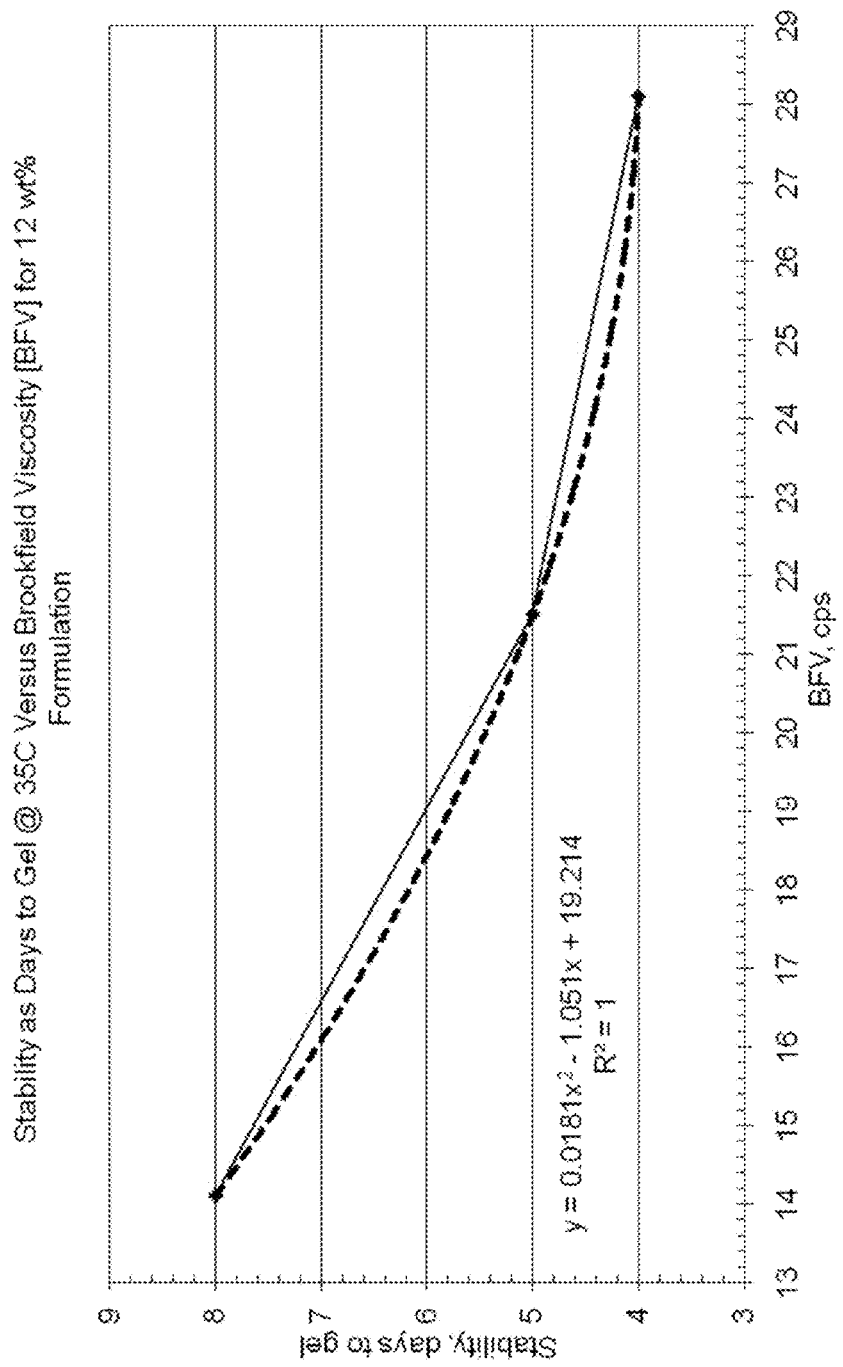
FIG. 4 shows the stability using a "Days to Gel" measurement parameter at 35° C. versus initial product Brookfield Viscosity [BFV] for a polymer prepared by glyoxalation of a diallyldimethylammonium chloride-co-acrylamide polymer [5/95 molar ratio] using a glyoxal to acrylamide molar ratio of 0.8 at 12 wt %.

The following definitions are intended to be clarifying and are not intended to be limiting.

"Acrylamide monomer" means a monomer of formula

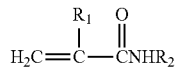

wherein $R_1$ is H or $C_1$-$C_4$ alkyl and $R_2$ is H, $C_1$-$C_4$ alkyl, aryl, or arylalkyl. Preferred acrylamide monomers are acrylamide and methacrylamide. Acrylamide is more preferred.

"Aldehyde" means a compound containing one or more aldehyde (—CHO) groups or a group capable of forming a reactive aldehyde group, where the aldehyde groups are capable of reacting with the aldehyde-reactive groups (e.g., amino or amido groups) of a polymer as described herein. Representative aldehydes include formaldehyde, paraformaldehyde, glutaraldehyde, glyoxal, the like, and any other suitable mono-functional or poly-functional aldehyde. Glyoxal is preferred.

"Aldehyde-functionalized" means the reaction product of a precursor polymer and an aldehyde, where aldehyde-reactive group(s) of the precursor polymer has reacted with terminal carbonyl group(s) of the aldehyde(s).

"Alkyl" means a monovalent group derived from a straight or branched chain saturated hydrocarbon by the removal of a single hydrogen atom. Representative alkyl groups include methyl, ethyl, n- and iso-propyl, cetyl, and the like.

"Alkylene" means a divalent group derived from a straight or branched chain saturated hydrocarbon by the removal of two hydrogen atoms. Representative alkylene groups include methylene, ethylene, propylene, and the like.

"Amido group" means a group of formula —C(O)$NHY_1$ where $Y_1$ is selected from H, alkyl, aryl, and arylalkyl.

"Amino group" means a group of formula —$NHY_2$ where $Y_2$ is selected from H, alkyl, aryl, and arylalkyl.

"Amphoteric" means a polymer derived from both cationic monomers and anionic monomers, and, possibly, other non-ionic monomer(s). Representative amphoteric polymers include copolymers composed of acrylic acid and DMAE-A.MCQ, terpolymers composed of acrylic acid, DADMAC and acrylamide, and the like.

"Aryl" means an aromatic monocyclic or multicyclic ring system of about 6 to about 10 carbon atoms. The aryl is optionally substituted with one or more $C_1$ to $C_{20}$ alkyl, alkoxy, or haloalkyl groups. Representative aryl groups include phenyl or naphthyl, or substituted phenyl or substituted naphthyl.

"Arylalkyl" means an aryl-alkylene-group where aryl and alkylene are defined herein. Representative arylalkyl groups include benzyl, phenylethyl, phenylpropyl, 1-naphthylmethyl, and the like. Benzyl is preferred.

"Diallyl-N,N-disubstituted ammonium halide monomer" means a monomer of the following formula.

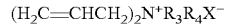

wherein $R_3$ and $R_4$ are independently $C_1$ to $C_{20}$ alkyl, aryl, or arylalkyl and X is an anionic counterion. Representative anionic counterions include halogen, sulfate, nitrate, phosphate, and the like. A preferred anionic counterion is halide. Chloride is preferred. A preferred diallyl-N,N-disubstituted ammonium halide monomer is diallyldimethylammonium chloride.

"Dispersion polymer" polymer means a water-soluble polymer dispersed in an aqueous continuous phase containing one or more organic or inorganic salts and/or one or more aqueous polymers. Representative examples of dispersion polymerization of water-soluble polymers in an aqueous continuous phase can be found in U.S. Pat. Nos. 5,605,970; 5,837,776; 5,985,992; 4,929,655; 5,006,590; 5,597,859; and 5,597,858 and in European Patent Nos. 183,466; 657,478; and 630,909.

"Emulsion polymer" and "latex polymer" mean a polymer emulsion comprising an aldehyde-functionalized polymer according to this invention in the aqueous phase, a hydrocarbon oil for the oil phase and a water-in-oil emulsifying agent. Inverse emulsion polymers are hydrocarbon continuous with the water-soluble polymers dispersed within the hydrocarbon matrix. The inverse emulsion polymers are then "inverted" or activated for use by releasing the polymer from the particles using shear, dilution, and, generally, another surfactant. See U.S. Pat. No. 3,734,873, incorporated herein by reference. Representative preparations of high molecular weight inverse emulsion polymers are described in U.S. Pat. Nos. 2,982,749; 3,284,393; and 3,734,873. See also, Hunkeler, et al., "*Mechanism, Kinetics and Modeling of the Inverse-Microsuspension Homopolymerization of Acrylamide,*" *Polymer*, vol. 30(1), pp 127-42 (1989); and Hunkeler et al., "*Mechanism, Kinetics and Modeling of Inverse-Microsuspension Polymerization: 2. Copolymerization of Acrylamide with Quaternary Ammonium Cationic Monomers,*" *Polymer*, vol. 32(14), pp 2626-40 (1991).

"Monomer" means a polymerizable allylic, vinylic, or acrylic compound. The monomer may be anionic, cationic, nonionic, or zwitterionic. Vinyl monomers are preferred, and acrylic monomers are more preferred.

Representative non-ionic, water-soluble monomers include acrylamide, methacrylamide, N,N-dimethylacrylamide, N,N-diethylacrylamide, N-isopropylacrylamide, N-vinylformamide, N-vinylmethylacetamide, N-vinyl pyrrolidone, hydroxyethyl methacrylate, hydroxyethyl acrylate, hydroxypropyl acrylate, hydroxypropyl methacrylate, N-t-butylacrylamide, N-methylolacrylamide, vinyl acetate, vinyl alcohol, and the like.

Representative anionic monomers include acrylic acid, and it's salts, including, but not limited to sodium acrylate, and ammonium acrylate, methacrylic acid, and it's salts, including, but not limited to sodium methacrylate, and ammonium methacrylate, 2-acrylamido-2-methylpropanesulfonic acid (AMPS), the sodium salt of AMPS, sodium vinyl sulfonate, styrene sulfonate, maleic acid, and it's salts, including, but not limited to the sodium salt, and ammonium salt, sulfonate, itaconate, sulfopropyl acrylate or methacrylate or other water-soluble forms of these or other polymerisable carboxylic or sulphonic acids. Sulfomethylated acrylamide, allyl sulfonate, sodium vinyl sulfonate, itaconic acid, acrylamidomethylbutanoic acid, fumaric acid, vinylphosphonic acid, vinylsulfonic acid, allylphosphonic acid, sulfomethylated acrylamide, phosphonomethylated acrylamide, itaconic anhydride, and the like.

Representative cationic monomers include monoallyl amine, diallyl amine, vinyl amine, dialkylaminoalkyl acrylates and methacrylates and their quaternary or acid salts, including, but not limited to, dimethylaminoethyl acrylate methyl chloride quaternary salt (DMAEA.MCQ), dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride and diallyldimethyl ammonium chloride (DADMAC). Alkyl groups are generally $C_1$ to $C_4$ alkyl.

Representative zwitterionic monomers are those that are a polymerizable molecule containing cationic and anionic (charged) functionality in equal proportions, so that the molecule is net neutral overall. Specific representative zwitterionic monomers include N,N-dimethyl-N-acryloyloxyethyl-N-(3-sulfopropyl)-ammonium betaine, N,N-dimethyl-N-acrylamidopropyl-N-(2-carboxymethyl)-ammonium betaine, N,N-dimethyl-N-acrylamidopropyl-N-(3-sulfopropyl)-ammonium betaine, N,N-dimethyl-N-acrylamidopropyl-N-(2-carboxymethyl)-ammonium betaine, 2-(methylthio)ethyl methacryloyl-S-(sulfopropyl)-sulfonium betaine, 2-[(2-acryloylethyl)dimethylammonio]ethyl 2-methyl phosphate, 2-(acryloyloxyethyl)-2'-(trimethylammonium)ethyl phosphate, [(2-acryloylethyl)dimethylammonio] methyl phosphonic acid, 2-methacryloyloxyethyl phosphorylcholine (MPC), 2-[(3-acrylamidopropyl)dimethylammonio]ethyl 2'-isopropyl phosphate (AAPI), 1-vinyl-3-(3-sulfopropyl)imidazolium hydroxide, (2-acryloxyethyl) carboxymethyl methylsulfonium chloride, 1-(3-sulfopropyl)-2-vinylpyridinium betaine, N-(4-sulfobutyl)-N-methyl-N,N-diallylamine ammonium betaine (MDABS), N,N-diallyl-N-methyl-N-(2-sulfoethyl) ammonium betaine, and the like.

"Papermaking process" means a method of making paper and paperboard products from pulp comprising forming an aqueous cellulosic papermaking furnish (optionally, with mineral fillers, such as calcium carbonates, clays, etc.), draining the furnish to form a sheet, and drying the sheet. It should be appreciated that any suitable furnish may be used. Representative furnishes include, for example, virgin pulp, recycled pulp, kraft pulp (bleached and unbleached), sulfite pulp, mechanical pulp, polymeric plastic fibers, the like, any combination of the foregoing pulps. The steps of forming the papermaking furnish, draining and drying may be carried out in any manner generally known to those skilled in the art. Other papermaking additives may be utilized as adjuncts with the polymer treatment of this invention, though it must be emphasized that no adjunct is required for effective activity. Such papermaking additives include, for example, retention aids (e.g., microparticles, flocculants, polymeric and inorganic coagulants, etc.), wet and dry strength additives (e.g., cationic starches, polyamidoamine epichlorohydrin-based polymers), sizing agents (e.g., rosin sizes, alkylene ketene dimmers, alkenyl succinic anhydrides), the like, and combinations of the foregoing.

The aldehyde-functionalized polymers of the invention can be added in wet end locations used for wet end additives, such as being added to thin stock or thick stock. The actual wet end location is not considered to be critical, but the aldehyde-functionalized polymers are preferably added prior to the addition of other cationic additives. Their addition to the wet end is not necessary, and the option of adding them after the formation of the sheet (e.g., near the press section) can also be practiced. For example, the polymer can be sprayed on the wet web prior to entering the press section, and this can be a preferred mode of addition to reduce dosages or the effects of interferences which might occur in the wet end. Other traditional wet end additives can be used in combination with the aldehyde-functionalized polymers, including retention aids, strength additives such as starches, sizing agents, and the like. Although aldehyde-functionalized polymers have demonstrated considerable usefulness in paper and paperboard applications, the stabilization of these polymers by the practice of this invention is thought to be useful in any application where such polymers are used and need not be limited to papermaking.

For example, when using aldehyde-functionalized polymers as described herein having net anionic charge, a method of fixing the polymer to the fiber is needed. This fixing is typically accomplished by using cationic materials in conjunction with the polymers. Such cationic materials are most frequently coagulants, either inorganic (e.g. alum, polyaluminum chlorides, iron chloride or sulfate, and any other cationic hydrolyzing salt) or organic (e.g. p-DADMACs, EPI/DMAs, PEIs, modified PEIs or any other high charged density low to medium molecular weight polymers). Additionally, cationic materials added for other purposes like starch, wet strength, or retention additives can also serve to fix the anionic polymer. No additional additives are needed to fix cationic aldehyde-functionalized polymers to the furnish components (e.g., fiber, and filler).

In one embodiment, useful increases in dewatering can be achieved with aldehyde-functionalized polymer doses in the range 0.05 to 15.0 lb polymer/ton of dry fiber with economically useful results normally achieved in the range 0.5 to 6.0 lb/ton depending on the particular papermaking circumstances (papermachine equipment and papermaking raw materials used) and type of activity desired. It should be appreciated that the described aldehyde-functionalized polymers are useful for all grades of paper and paperboard, including board grades, fine paper grades, and tissue/towel grades. Recycle board grades using OCC (old corrugated containers)

with or without mixed waste, alkaline fine paper grades, and tissue/towel grades have been particularly responsive.

In one embodiment, a method of producing a medium having cellulosic fibers includes adding a composition of the invention to the medium at any point in a papermaking process, the medium optionally having mineral filler(s). The composition may be added at a point selected from the group consisting of: wet end, including thin stock and/or thick stock; indirectly applied to the paper sheet via application to Yankee dryer; directly to the paper sheet; and any combination of the foregoing. The composition may be added at a dosage rate of about 0.01 lbs to about 100 lbs of active per ton of dry fiber.

Polymers for inclusion in the composition and method of this invention are aldehyde-functionalized polymers prepared by reacting a precursor or preformed polymer comprising one or more aldehyde-reactive moieties with one or more aldehydes. Such polymers may have various architectures including linear, branched, star, block, graft, dendrimer, the like, and any other suitable architecture. Preferred polymers comprise those having amino or amido groups as the aldehyde-reactive moieties. These precursor or preformed polymers may be derived from any suitable source and synthesized using any suitable method. For example, the aldehyde-reactive polymers may be formed via emulsion, dispersion, or solution polymerization and may contain nonionic, cationic, anionic, and zwitterionic monomeric species with the polymer. Moreover, these monomeric species may be present in any amount and in any combination in the polymer.

In an embodiment, polyamines are prepared by modification of a pre-formed polyamide, for example by hydrolysis of acrylamide-vinylformamide copolymer using acid or base as described in U.S. Pat. Nos. 6,610,209 and 6,426,383.

In an embodiment, polyaminoamides may be prepared by direct amidation of polyalkyl carboxylic acids and transamidation of copolymers containing carboxylic acid and (meth)acrylamide units as described in U.S. Pat. No. 4,919,821.

In another embodiment, the preformed polymers are prepared as an emulsion or latex polymer. For example, the aqueous phase is prepared by mixing together in water one or more water-soluble monomers, and any polymerization additives such as inorganic salts, chelants, pH buffers, and the like. The oil phase is prepared by mixing together an inert hydrocarbon liquid with one or more oil soluble surfactants. The surfactant mixture should have a low hydrophilic-lypophilic balance (HLB), to ensure the formation of an oil continuous emulsion. Appropriate surfactants for water-in-oil emulsion polymerizations, which are commercially available, are compiled in the North American Edition of McCutcheon's Emulsifiers & Detergents. The oil phase may need to be heated to ensure the formation of a homogeneous oil solution. The oil phase is then charged into a reactor equipped with a mixer, a thermocouple, a nitrogen purge tube, and a condenser. The aqueous phase is added to the reactor containing the oil phase with vigorous stirring to form an emulsion.

The resulting emulsion is heated to the desired temperature, purged with nitrogen, and a free-radical initiator is added. The reaction mixture is stirred for several hours under a nitrogen atmosphere at the desired temperature. Upon completion of the reaction, the water-in-oil emulsion polymer is cooled to room temperature, where any desired post-polymerization additives, such as antioxidants, or a high HLB surfactant (as described in U.S. Pat. No. 3,734,873) may be added. The resulting emulsion polymer is a free-flowing liquid. An aqueous solution of the water-in-oil emulsion polymer can be generated by adding a desired amount of the emulsion polymer to water with vigorous mixing in the presence of a high-HLB surfactant (as described in U.S. Pat. No. 3,734,873).

In another embodiment, the preformed polymer used in the invention may be a dispersion polymer. In a typical procedure for preparing a dispersion polymer, an aqueous solution containing one or more inorganic or organic salts, one or more water-soluble monomers, any polymerization additives such as processing aids, chelants, pH buffers and a water-soluble stabilizer polymer is charged to a reactor equipped with a mixer, a thermocouple, a nitrogen purging tube, and a water condenser. The monomer solution is mixed vigorously, heated to the desired temperature, and then a free radical initiator is added. The solution is purged with nitrogen while maintaining temperature and mixing for several hours. After this time, the mixture is cooled to room temperature, and any post-polymerization additives are charged to the reactor. Water continuous dispersions of water-soluble polymers are free flowing liquids with product viscosities generally in the range of about 100 to about 10,000 cP, measured at low shear.

In another embodiment, the preformed or precursor polymers used in the invention are solution polymers. In a typical procedure for preparing solution polymers, an aqueous solution containing one or more water-soluble monomers and any additional polymerization additives such as chelants, pH buffers, and the like, is prepared. This mixture is charged to a reactor equipped with a mixer, a thermocouple, a nitrogen purging tube and a water condenser. The solution is mixed vigorously, heated to the desired temperature, and then one or more free radical polymerization initiators are added. The solution is purged with nitrogen while maintaining temperature and mixing for several hours. Typically, the viscosity of the solution increases during this period. After the polymerization is complete, the reactor contents are cooled to room temperature and then transferred to storage. Solution polymer viscosities vary widely, and are dependent upon the concentration and molecular weight and structure of the active polymer component.

Polymerization reactions are typically initiated by any means which results in generation of a suitable free-radical. Thermally derived radicals, in which the radical species results from thermal, homolytic dissociation of an azo, peroxide, hydroperoxide and perester compound are preferred. Preferred initiators are azo compounds including 2,2'-azobis(2-amidinopropane)dihydrochloride, 2,2'-azobis[2-(2-imidazolin-2-yl)propane]dihydrochloride, 2,2'-azobis(isobutyronitrile) (AIBN), 2,2'-azobis(2,4-dimethylvaleronitrile) (AIVN), the like, and combinations thereof. More preferred initiators include peroxides, such as ammonium persulfate, sodium persulfate, the like, and combinations thereof.

In alternative embodiments, the polymerization processes can be carried out as a batch process or in steps. In a representative batch process, all of the monomers are reacted together, whereas in a step or semi-batch process, a portion of the monomer is withheld from the main reaction and added over time to affect the compositional drift of the copolymer or the formation of the dispersion particles. In a continuous process embodiment, all of the monomer is added over time and affects the compositional drift differently.

The polymerization and/or post polymerization reaction conditions are selected such that the resulting polymer comprising aldehyde-reactive moieties (i.e., the preformed or precursor polymer) has a molecular weight of at least about 1,000 g/mole, preferably about 2,000 to about 10,000,000 g/mole. This polymer is then functionalized by reaction with one or more aldehydes. Suitable aldehydes include any compound containing one or more aldehyde (—CHO) functional groups (i.e., mono-functional or poly-functional aldehydes) and having sufficient reactivity to react with the aldeyhyde-reactive moieties (e.g., amino or amido groups) of the polymer. Representative aldehydes include formaldehyde, paraformaldehyde, glutaraldehyde, glyoxal, the like, and any other suitable reactive aldehyde.

In an embodiment, the aldehyde-functionalized polymer is prepared by reacting the polyamide or polyamine with one or more aldehydes at a pH between 4 to 12. The total concentration of polymer backbone (i.e., preformed or precursor polymer having aldehyde-reactive moieties) plus aldehyde is between about 2 to about 35 weight percent. Generally, an aqueous solution of the polymer backbone is prepared for better reaction rate control and increased product stability. The pH of the aqueous polymer backbone solution is increased to between about 4 to about 12. The reaction temperature is generally about 20° C. to about 80° C. preferably about 20° C. to about 40° C. An aqueous aldehyde solution is added to the aqueous polymer backbone solution with good mixing to prevent gel formation. The rate of viscosity increase is monitored using a Brookfield viscometer to follow the cross-linking reaction. A viscosity increase of 0.5 cps indicates an increase in polymer molecular weight and an increase in polymer precursor cross-linking.

Generally, the desired viscosity increase corresponds to a desired level of activity which generally reaches a maximum or a point of diminishing activity at a specific viscosity. The rate of reaction depends on the temperature, total concentration of polymer and aldehyde, the ratio of aldehyde to amide/amine functional groups, and pH. Higher rates of glyoxylation (in the case where glyoxal is used as the aldehyde) are expected when the temperature, total concentration of polymer and aldehyde, the ratio of aldehyde to amide/amine functional groups or pH is increased. The rate of reaction can be slowed down by decreasing the total concentration of polymer and aldehyde, temperature, the ratio of aldehyde to amide/amine functional groups or pH (to between about 2 to about 3.5). The amount of unreacted aldehyde at the end of the reaction increases as the ratio of aldehyde to amide/amine functional groups is increased.

In a preferred embodiment, the precursor polymer is prepared from a DADMAC and acrylamide copolymer. Monomers of DADMAC and acrylamide may be present in weight-to-weight ratios in the precursor polymer ranging from about 5/95 to about 95/5, respectively. This precursor copolymer preferably has a weight average molecular weight of about 17,000 g/mole and is reacted, for example, with glyoxal. The amount of glyoxal can vary but is usually added to achieve a glyoxal to acrylamide mole ratio of 0.1 to 1.0. A preferred DADMAC/acrylamide weight-to-weight ratio is 10/90.

The reaction conditions are preferably selected such that the molar ratio of polymer precursor to aldehyde is from about 0.05 to about 1.5. This range of molar ratios may result in a wide range of the aldehyde-reactive moieties of the precursor polymer being functionalized. For example, from about 9 mole percent to greater than 50 mole percent of the aldehyde-reactive moieties may be functionalized. Moreover, depending on the particular combination of chosen aldehydes, from about 20 to about 50 percent or more of those reacted moieties may be poly-reacted.

In one embodiment, 15 mole percent, preferably at least about 20 mole percent of the amino or amido groups in the polymer react with the aldehyde to form the aldehyde-functionalized polymer. The resulting aldehyde-functionalized polymers have a weight average molecular weight of at least about 100,000 g/mole, preferably at least about 300,000 g/mole.

In an embodiment, the aldehyde-functionalized polymer is formed from one or more precursor polymers having aldehyde-reactive moieties selected from any combination of amines, amides, and hydroxyls.

In another embodiment, the aldehyde-functionalized polymer is a copolymer comprising about 1 to about 99 mole percent acrylamide monomers and about 95 mole percent to about 1 mole percent of one or more cationic, anionic, nonionic, or zwitterionic monomers, or a mixture thereof. Copolymers prepared from nonionic aldehyde-reactive monomers and cationic monomers preferably have a cationic charge of about 1 to about 50 mole percent, more preferably from about 1 to about 30 mole percent. Copolymers prepared from nonionic aldehyde-reactive monomers and anionic monomers preferably have an anionic charge of about 1 to about 50 mole percent, more preferably from about 1 to about 30 mole percent. Zwitterionic polymers preferably comprise 1 to about 95 mole percent, preferably 1 to about 50 mole percent zwitterionic monomers.

For example, reaction of a 95/5 mole percent diallyldimethylammonium chloride/acrylamide copolymer with glyoxal in a molar ratio of 0.4 to 1 glyoxal to acrylamide results in a 95/5 mole percent acrylamide/DADMAC copolymer with about 15 to 23 mole percent monoreacted and directed acrylamide and with about 60 to 70 mole percent total unreacted glyoxal at the target product viscosity and molecular weight. A molar ratio of 0.8 to 1 glyoxal to acrylamide results in a 95/5 mole percent acrylamide/DADMAC copolymer with about 22 to 30 mole percent monoreacted and directed acrylamide and with about 70 to 80 mole percent total unreacted glyoxal at the target product viscosity and molecular weight.

In another embodiment, the aldehyde-functionalized polymers are amphoteric polymers that preferably have an overall positive charge. Preferred amphoteric polymers are composed of up to about 40 mole percent cationic monomers and up to about 20 mole percent anionic monomers with the remaining monomers preferably being aldehyde-reactive monomers. More preferred amphoteric polymers comprise about 5 to about 10 mole percent cationic monomers and about 0.5 to about 4 mole percent anionic monomers with the remaining monomers preferably being aldehyde-reactive monomers.

In an embodiment, the disclosed polymer composition comprises from about 10 to about 90 mole percent unreacted aldehyde.

In a further embodiment, the product shelf stability depends on the storage temperature, initial product viscosity, total amount of reactive monomers, total concentration of polymer and aldehyde, the ratio of aldehyde to aldehyde-reactive functional groups, precursor average molecular weight, and pH. Generally, the pH of the product is maintained at a low pH (2 to 3.5) and the total concentration of polymer and aldehyde is optimized to extend shelf stability.

In a preferred embodiment of the invention, the aldehyde-functionalized polymer composition of the invention further comprises a stabilizing agent in an amount ranging from about 0.5 wt % to about 10 wt %, based on total weight of the composition. In a preferred embodiment of the invention, the aldehyde-functionalized polymer composition of the invention comprises one or more aldehyde-functionalized polymers stably present in an amount from about 2 wt % to about 25 wt %, based on total weight of the composition.

Addition of one or more stabilizing agents to the composition results in increased storage time or shelf life. In a preferred method for increasing storage time for the more aldehyde-functionalized polymers composition of the invention, one or more stabilizing agents are introduced into the reaction mixture while the precursor is undergoing aldehyde-functionalization or to the aldehyde-functionalized product. The added stabilizing agent(s) preferably increase the storage time as measured relative to a comparable non-stabilized aldehyde-functionalized polymer. A representative method for measuring stability includes determining the viscosity of the product until it rapidly increases to the point of gelling exhibited during an extended storage time relative to a comparable non-stabilized aldehyde-functionalized polymer. An example of this measurement technique is provided in Example 8 below.

In an embodiment, such a method of increasing storage time may include the steps of (i) preforming the polymer having one or more aldehyde-reactive moieties, (ii) adding the one or more reactive aldehydes to the preformed polymer, (iii) inducing reaction between the preformed polymer and the one or more reactive aldehydes to form the one or more aldehyde-functionalized polymers, and (iv) adding the one or more stabilizing agents step-wise, batch, semi-batch, continuous, or intermittent at any time and at any rate before, during, or after the foregoing steps.

In another embodiment, such a method may include (i) preforming a polymer having one or more aldehyde-reactive moieties, (ii) adding one or more reactive aldehydes to the preformed polymer to form a reaction mixture, (iii) adding the one or more stabilizing agents to the reaction mixture, and (iv) inducing reaction between the preformed polymer and the one or more reactive aldehydes to form the stabilized aldehyde-functionalized polymer composition.

In a further embodiment, such a method may include (i) preforming the polymer having one or more aldehyde-reactive moieties, (ii) adding the one or more reactive aldehydes to the preformed polymer, (iii) inducing reaction between the preformed polymer and the one or more reactive aldehydes to form the one or more aldehyde-functionalized polymers, and (iv) adding the one or more stabilizing agents to the aldehyde-functionalized polymers to form the stabilized aldehyde-functionalized polymer composition.

Representative stabilizing agents are inorganic salts, organic additives, and combinations thereof.

Representative classes of inorganic salts include alkali metal salts, alkaline earth metal salts, transition metal salts, hydrates thereof, the like, and any combination of the foregoing. Specific examples of inorganic salts include $MgSO_4$ and its hydrated forms (e.g., $MgSO_4.7H_2O$), $MgCl_2$ and its hydrated forms (e.g., $MgCl_2.6H_2O$), $Mg(acetate)_2$ and its hydrated forms (e.g., $Mg(OAc)_2.4H_2O$), $ZnSO_4$ and its hydrated forms (e.g., $ZnSO_4.7H_2O$), $Na_2SO_4$, $NaCl$, $(NH_4)_2SO_4$, and any combination of the foregoing.

Organic additives are generally selected from diols, triols, polyols, saccharides, the like, and any combination of the foregoing. Specific examples of organic additives include glycerol, ethyleneglycol, urea, and any combination of the foregoing.

The foregoing may be better understood by reference to the following examples, which are intended for illustrative purposes and are not intended to limit the scope of the invention.

Example 1

The initial starting viscosity of the product refers to the Brookfield viscosity [BFV] at which an aldehyde-functionalization (glyoxalation in this particular example) cross-linking reaction was quenched with acid and was measured with the Brookfield spindle #1 at 60 rpm and 25° C. To make a proper comparison of stability between two samples, the samples should have the same initial BFV. In practice, producing samples at the same initial BFV is difficult to achieve because viscosity control is limited.

Consequently, the stability of samples without additives was determined over a range of initial BFVs for 2 actives concentrations and at room temperature (21° C.) and 35° C. Using plots of stability as measured by days to gel versus initial BFV, data was fit to a 2nd order polynomial and this equation was then used to determine the stability at any initial BFV. FIGS. 1 to 4 provide the plots and polynomial fits used for determining the stability of untreated samples that were used for comparing the stability of samples containing the various additives. This data also illustrates the large change in stability as a function of the initial BFV.

Example 2

FIGS. 5 and 6 illustrate comparisons between the stability of samples prepared with various additives as well as addition methods and reference stabilities calculated from the equations shown in FIGS. 1 to 4 using the appropriate temperature and wt % polymer actives. Inspection of the tables in FIGS. 5 and 6 indicates that demonstrable increases in stability can be achieved with the addition of the various additives examined. In particular, $MgSO_4.7H_2O$, $MgCl_2.6H_2O$, $ZnSO_4.7H_2O$, glycerol, and ethyleneglycol appear to be useful additives for improving the stability of aldehyde-functionalized polymers. $MgSO_4.7H_2O$ added pre-glyoxalation appears to provide the greatest increases to stability.

Example 3

This Example illustrates preparation of 95/5 mole % Acrylamide/DADMAC copolymer. To a 1,500-mL reaction flask fitted with a mechanical stirrer, thermocouple, condenser, nitrogen purge tube, and addition port was added 116.4 g of deionized or soft water, 26.3 g of phosphoric acid, 63.8 g of a 62% aqueous solution of diallyldimethyl ammonium chloride (available from Nalco, An Ecolab Company, Naperville, Ill.), 7.6 g of sodium formate, and 0.09 g of ethylenediaminetetraacetic acid, tetra sodium salt. The reaction mixture was stirred at 400 rpm and the pH adjusted to 4.7 to 4.9 using 17.3 g of aqueous 50% sodium hydroxide solution. The resulting mixture was heated to 100° C. and purged with nitrogen at 50 mL/min. Upon reaching 100° C., 17.6 g of a 25.0% aqueous solution of ammonium persulfate is added to the reaction mixture over a period of 135 minutes. Five minutes after starting the ammonium persulfate addition, 750.9 g of a 49.5% aqueous solution of acrylamide is added to the reaction mixture over a period of 120 minutes. The reaction was held at 100° C. for 180 minutes after ammonium persulfate addition. The reaction mixture was then cooled to ambient temperature and the pH was adjusted to 5.2 to 5.8 using 50% aqueous sodium hydroxide solution or concentrated sulfuric acid. The product was a viscous, clear to amber solution. The product had a molecular weight of about 20,000 g/mole.

Example 4

This Example illustrates glyoxalation of 95/5 mole % Acrylamide/DADMAC copolymer with 0.8 to 1 glyoxal to acrylamide mole ratio at 9.0% actives (total glyoxal and polymer). To a 2,000-mL reaction flask fitted with a mechanical stirrer, thermocouple, condenser, addition port and sampling valve at the bottom of the reactor was added 238.0 g of a 41% aqueous solution of 95/5 mole % acrylamide/DADMAC copolymer, prepared as in Example 4, and 1304.0 g of deionized or soft water. The polymer solution was stirred at 400 rpm. The pH of the solution was adjusted to 8.8 to 9.1 by adding 5.8 g of 50% aqueous sodium hydroxide solution. The reaction temperature was set at 24 to 26° C. Glyoxal (143.0 g of a 40% aqueous solution) was added to the reaction mixture over 20 to 30 minutes. The Brookfield viscosity (Brookfield Programmable LVDV-II+ Viscometer, LV #1 spindle at 60 rpm, Brookfield Engineering Laboratories, Inc, Middleboro, Mass.) of the reaction mixture was about 4 to 5 cps after glyoxal addition. The pH of the reaction mixture was adjusted to 7.5 to 8.8 using 10% aqueous sodium hydroxide (25 g) added over 20 to 30 minutes. The Brookfield viscosity (Brookfield Programmable LVDV-II+ Viscometer, LV #1 spindle at 60 rpm, Brookfield Engineering Laboratories, Inc, Middleboro, Mass.) of the reaction mixture was about 4 to 5 cps after sodium hydroxide addition. The pH of the reaction mixture was maintained at about 7.0 to 8.8 at about 24 to 26° C. with good mixing. The Brookfield viscosity was monitored and upon achieving the desired viscosity increase of greater than or equal to 1 cps (5 to 200 cps, 100,000 g/mole) the pH of the reaction mixture was decreased to 2 to 3.5 by adding sulfuric acid (93%) to substantially decrease the reaction rate. The rate of viscosity increase was found to be dependent on the reaction pH and temperature. The higher the pH of the reaction mixture the faster the rate of viscosity increase. The rate of viscosity increase was controlled by decreasing the pH of the reaction mixture. The product was a clear to hazy, colorless to amber, fluid with a Brookfield viscosity greater than or equal to 5 cps. The resulting product was more stable upon storage when the Brookfield viscosity of the product is less than 40 cps and when the product was diluted with water to lower percent actives. The product can be prepared at higher or lower percent total actives by adjusting the desired target product viscosity. $C^{13}$ NMR analysis of the samples prepared indicated that about 70 to 80% of the glyoxal was unreacted and 15 to 35 mole percent of the acrylamide units reacted with glyoxal.

Example 5

This Example illustrates glyoxalation of 95/5 mole % Acrylamide/DADMAC copolymer with 0.8 to 1 glyoxal to acrylamide mole ratio at 9.0% actives (total glyoxal and polymer) and with the addition of 6 wt % of $MgSO_4 \cdot 7H_2O$ to form the stabilized the product. To a 2,000-mL reaction flask fitted with a mechanical stirrer, thermocouple, condenser, addition port and sampling valve at the bottom of the reactor was added 283.2 g of a 41% aqueous solution of 95/5 mole % acrylamide/DADMAC copolymer, prepared as in Example 3, 123 g of $MgSO_4 \cdot 7H_2O$, and 1,435.0 g of deionized or soft water. The polymer solution was stirred at 500 rpm. The pH of the solution was adjusted to 8.8 to 9.1 by adding 12 g of 50% aqueous sodium hydroxide solution. The reaction temperature was set at 24 to 26° C. Glyoxal (170.0 g of a 40% aqueous solution) was added to the reaction mixture over 30 to 40 minutes. The Brookfield viscosity (Brookfield DV-E Viscometer #1 spindle at 60 rpm) of the reaction mixture was about 5 to 6 cps after glyoxal addition. The pH of the reaction mixture was adjusted to 7.5 to 8.8 using 10% aqueous sodium hydroxide (11.5 g). The Brookfield viscosity (Brookfield DV-E Viscometer #1 spindle at 60 rpm) of the reaction mixture was about 5 to 6 cps after sodium hydroxide addition. The pH of the reaction mixture was maintained at about 7.0 to 8.8 at about 24 to 26° C. with good mixing. The Brookfield viscosity was monitored and upon achieving the targeted viscosity value (5 to 200 cps, >100,000 g/mole) the pH of the reaction mixture was decreased to 2 to 3.5 by adding sulfuric acid (93%). The product was a clear to hazy, colorless to amber, fluid with a Brookfield viscosity greater than or equal to 6 cps. The product can be prepared at higher or lower percent total actives by adjusting the desired target product viscosity. The stabilizing agent can also be added pre-, during, or post-glyoxalation at any desired wt %.

Example 6

This Example illustrates that the press dewatering effectiveness of a representative aldehyde-functionalized polymer is not diminished by the presence of the $MgSO_4 \cdot 7H_2O$ stability additive. The glyoxalated DADMAC/Acrylamide polymers evaluated were prepared with glyoxal to acrylamide mole ratios of 0.8 with an actives concentration of 9.0 wt %. The polymers were prepared both with and without $MgSO_4 \cdot 7H_2O$ at a concentration 6.0 wt % and were compared through a paper machine trial.

The trial was run on a Fourdrinier papermachine with a Belbond top former and press section consisting of two simple roll presses, the first of which had a vacuum roll. The press dewatering trial was conducted on an alkaline fine paper grade of 119#3000 $ft^2$ basis weight and a sheet ash of 16 wt %. Press dewatering was monitored by steam pressure in the main section drier prior to the size press. The sheet moisture was regulated to a constant value by changing the amount of steam to the drier section, as indicated by the steam pressure. If the sheet moisture increased, a greater steam pressure was required or the machine speed slowed down. Once the maximum steam pressure was achieved, the machine must normally be slowed down to maintain constant sheet moisture. A maximum steam pressure on this machine was 95 psi. Normally, a slightly lower pressure was run in order to maintain some slack in the system to handle natural variations that occur on all papermachines.

Trial results are shown in Table 1. The trial was begun with the product without the 6 wt % $MgSO_4 \cdot 7H_2O$ stabilizer at the actives dose used normally by the mill on this grade and was fed to the thick stock. Baseline data for machine speed and main section steam were collected. Then, the product with the 6 wt % $MgSO_4 \cdot 7H_2O$ stabilizer was substituted for the product without the stabilizer on an equal actives basis. After some equilibration time, the stabilized machine speed was unchanged while the steam pressure was slightly less. Thus the machine speed could be maintained with less steam, indicating a possible slight improvement in press dewatering. Subsequently, the product dose was reduced to zero (indicated as "None" in Table 1). This point demonstrates what could happen if the product was removed. As also noted in Table 1, after an equilibration time, the machine speed was reduced from 1,122 ft/min to 1,067 ft/min but required slightly higher steam pressure to achieve this slower speed. This data showed that no loss in press dewatering activity occurred when the 6 wt % $MgSO_4 \cdot 7H_2O$ used for stabilization was present in the product.

TABLE 1

Timeline and Results

| Length (min) | Product | Actives Dosage | Machine Speed, ft/min | Main Section Steam |
|---|---|---|---|---|
| 120 | Without 6 wt % $MgSO_4 \cdot 7H_2O$ | 2 #/ton | 1122 | 91 psi |
| 126 | With 6 wt % $MgSO_4 \cdot 7H_2O$ | 2 #/ton | 1122 | 89 psi |
| 72 | None | OFF | 1067 | 92 psi |

Example 7

This Example illustrates that the wet and dry strength effectiveness of a representative aldehyde-functionalized polymer was not hurt by the presence of a stabilizing agent. The glyoxalated DADMAC/Acrylamide [10/90 wt ratio] polymers evaluated were prepared with a glyoxal to acrylamide mole ratios 0.8 with an actives concentration of 9.0 wt %. The polymers were prepared both with and without $MgSO_4 \cdot 7H_2O$ at a concentration of 6.0 wt % and were compared through evaluation of laboratory handsheets. Handsheets were prepared from unrefined bleached softwood kraft fiber using Noble & Wood handsheet forming equipment with a single nip press and drum dryer. Basis weight was 60 gsm and furnish pH was 6.3. Sheets were conditioned overnight in a controlled temperature/humidity room [23° C. and 50% humidity], and physical tests were measured under these same conditions. Dry tensiles were measured according to TAPPI method T494 using a Thwing-Albert Universal Materials Tester and a 4 inch span. Tensiles were normalized by basis weight, and results reported as tensile index. Wet tensiles were basically determined in the same manner as the dry tensile except that the test strip was contacted with a wet ¼ inch paint brush to saturate the center of the test strip with deionized water.

Table 2 below presents the dry and wet tensile index results for the equivalent glyoxalated DADMAC/AcAm polymer with and without the 6 wt % $MgSO_4 \cdot 7H_2O$ stability additive. The results demonstrated that no loss in strength performances was detected upon addition of the additive.

TABLE 2

Tensile Index Results

| Strength Test | Dose, lb/ton | Without $MgSO_4 \cdot 7H_2O$ | 95% conf. Limit | With $MgSO_4 \cdot 7H_2O$ | 95% conf. Limit |
|---|---|---|---|---|---|
| Dry Tensile Index, Nm/g | 0 | 27.8 | 1.0 | 27.8 | 1.0 |
| | 4 | 37.1 | 2.3 | 37.0 | 1.5 |
| | 8 | 46.2 | 1.6 | 42.9 | 1.4 |
| | 16 | 52.2 | 1.8 | 50.0 | 1.9 |
| Wet Tensile Index, Nm/g | 0 | 1.5 | 0.0 | 1.5 | 0.0 |
| | 4 | 8.0 | 0.6 | 8.8 | 0.4 |
| | 8 | 11.8 | 0.5 | 11.5 | 0.5 |
| | 16 | 15.3 | 0.9 | 15.2 | 0.8 |

Example 8

Figure 7:
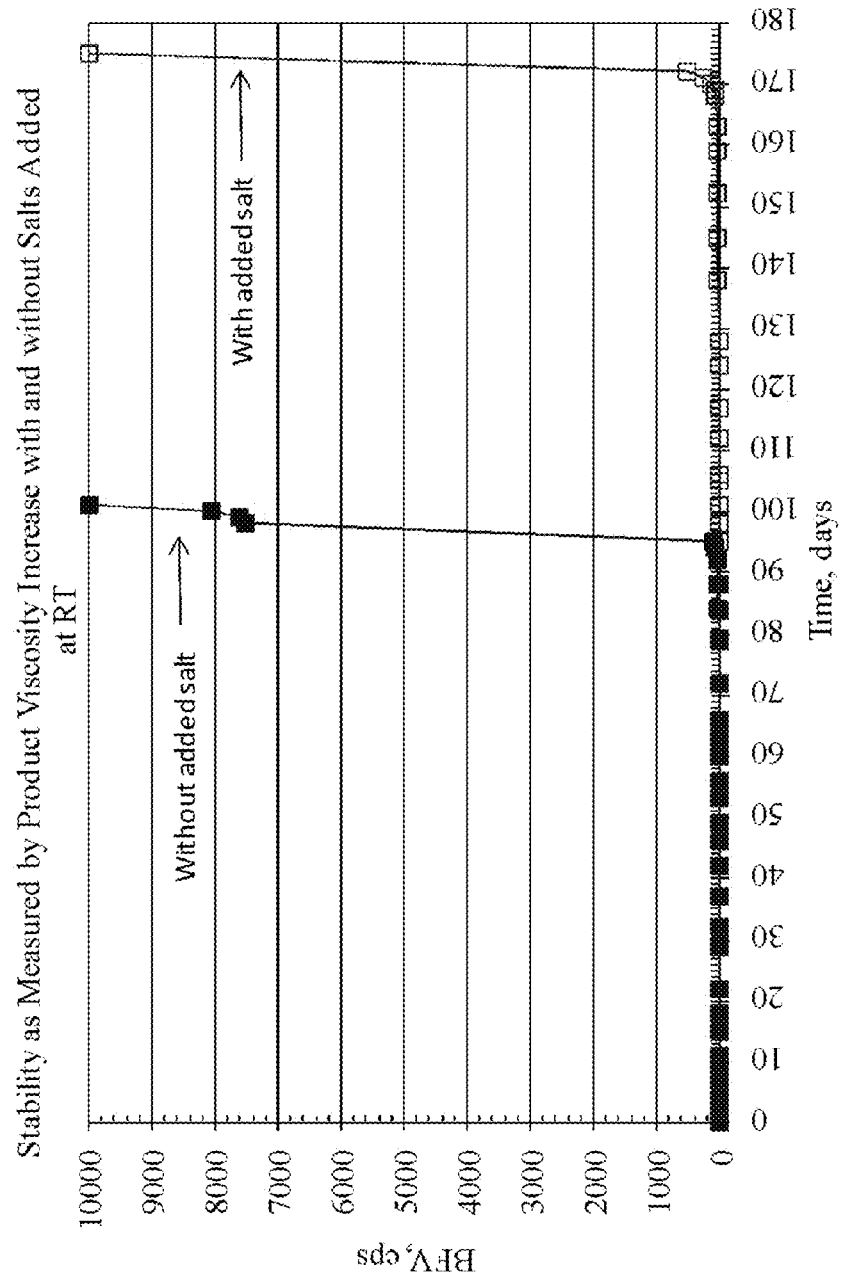
FIG. 7 illustrates a stability test curve (i.e., Brookfield Viscosity vs. Days) for 0.8 glyoxalated DADMAC/AcAm formulations of the invention (as measured pre-reaction) with and without 6 wt % $MgSO_4$ added prior to initiating the glyoxalating reaction.

FIG. 7 provides an illustration of a stability test curve (i.e., Brookfield Viscosity vs. Days) for 0.8 glyoxalated DADMAC/AcAm formulations (as measured pre-reaction) with and without 6 wt % $MgSO_4$ added prior to initiating the glyoxalating reaction.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, any exemplary list herein provided should be interpreted to include any combination of listed items.

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible and should all be understood to include the term "about." Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A composition comprising: (i) one or more aldehyde-functionalized polymers with a weight average molecular weight of at least about 50,000 g/mole and (ii) one or more stabilizing agents, wherein the stabilizing agent includes an inorganic salt selected from the group consisting of: $MgSO_4$ and its hydrated forms, $MgCl_2$ and its hydrated forms, $Mg(acetate)_2$ and its hydrated forms, $ZnSO_4$ and its hydrated forms, $Na_2SO_4$, NaCl, $(NH_4)_2SO_4$, and any combination of the foregoing.

2. The composition of claim 1, wherein the one or more aldehyde-functionalized polymers is stably present in an amount from about 2 wt % to about 25 wt %, based on total weight of the composition.

3. The composition of claim 1, wherein the one or more aldehyde-functionalized polymers is formed from one or more precursor polymers having aldehyde-reactive moieties selected from the group consisting of: amines, amides, hydroxyls, and any combination of the foregoing.

4. The composition of claim 1, wherein the one or more aldehyde-functionalized polymers contains at least one aldehyde-reactive monomer species present in any amount and in any combination in said aldehyde-functionalized polymer, said monomer species selected from the group consisting of: nonionic monomers; cationic monomers; anionic monomers; zwitterionic monomers; and any combination of the foregoing.

5. The composition of claim 1, wherein the one or more aldehyde-functionalized polymers comprise a copolymer formed from diallydimethylammonium chloride monomers and acrylamide monomers in a weight-to-weight ratio of about 10/90, respectively.

6. The composition of claim 1, wherein said aldehyde-functionalized polymer is formed by reacting one or more precursor polymers having aldehyde-reactive moieties with one or more types of mono-functional and/or poly-functional aldehydes wherein the molar ratio of the one or more precursor polymers to the one or more types of mono-functional and/or poly-functional aldehydes is about 0.05 to about 1.5, respectively.

7. The composition of claim 1, wherein the one or more aldehyde-functionalized polymers are formed from by reacting a preformed polymer having one or more aldehyde-reactive moieties with one or more aldehydes selected from the group consisting of: formaldehyde, paraformaldehyde, glyoxal, glutaraldehyde, and combinations thereof.

8. The composition of claim 7, wherein at least about 2 mole percent of the aldehyde-functionalized moieties in said aldehyde-functionalized polymer are at least di-reacted.

9. The composition of claim 1, wherein the aldehyde-functionalized polymers have a weight average molecular weight of at least about 300,000 g/mole.

10. The composition of claim 1, wherein the stabilizing agent is present in the composition from about 0.5 wt % to about 10 wt %, based on total weight of the composition.

11. The composition of claim 1, wherein the stabilizing agent includes an inorganic salt selected from the group consisting of: $MgSO_4.7H_2O$; $MgCl_2.6H_2O$; $Mg(acetate)_2.4H_2O$; $ZnSO_4.7H_2O$; $Na_2SO_4$; NaCl; $(NH_4)_2SO_4$; and any combination of the foregoing.

12. The composition of claim 1, wherein the stabilizing agent is $MgSO_4.7H_2O$ and is present in the composition at about 6 wt %.

13. The composition of claim 1, wherein the stabilizing agent includes an organic additive selected from the group consisting of: diols, triols, polyols, saccharides, and any combination of the foregoing.

14. The composition of claim 1, wherein the stabilizing agent includes an organic additive selected from the group consisting of: glycerol, ethyleneglycol, urea, and any combination of the foregoing.

15. A method of producing a medium having cellulosic fibers, comprising adding the composition of claim 1 to the medium at any point in a papermaking process, the medium optionally having mineral filler(s).

16. The method of claim 15, wherein the composition is added at a point selected from the group consisting of: wet end, including thin stock and/or thick stock; indirectly applied to the paper sheet via application to Yankee dryer; directly to the paper sheet; and any combination of the foregoing.

17. The method of claim 15, further comprising adding the composition of claim 1 at a dosage rate of about 0.01 lbs to about 100 lbs of active per ton of dry fiber.

18. A composition comprising: (i) one or more aldehyde-functionalized polymers comprising amino and/or amido groups wherein at least about 15 mole percent of the amino and/or amido groups are functionalized by reacting with one or more aldehydes; (ii) at least about 70 to about 80 mole percent of the one or more aldehydes remain unreacted, wherein the amount of unreacted aldehyde is based on an amount used to functionalize the amino or amido groups; and (iii) one or more stabilizing agents selected from $MgSO_4.7H_2O$; $MgCl_2.6H_2O$; $Mg(acetate)_2.4H_2O$; $ZnSO_4.7H_2O$; $Na_2SO_4$; NaCl; $(NH_4)_2SO_4$; and any combination of the foregoing.

19. A composition comprising: (i) one or more aldehyde-functionalized polymers comprising amino and/or amido groups, the amino and/or amido groups are functionalized by reacting with one or more aldehydes with the initial molar ratio of the aldehydes to amino and/or amido groups being at least 0.8 and (ii) one or more stabilizing agents selected from $MgSO_4.7H_2O$; $MgCl_2.6H_2O$; $Mg(acetate)_2.4H_2O$; $ZnSO_4.7H_2O$; $Na_2SO_4$; NaCl; $(NH_4)SO_4$; and any combination of the foregoing.

* * * * *